US009567168B1

(12) United States Patent
Tibbens et al.

(10) Patent No.: US 9,567,168 B1
(45) Date of Patent: Feb. 14, 2017

(54) MOBILE CROSSDOCK

(71) Applicant: Amazon Technologies, Inc., Seattle, WA (US)

(72) Inventors: Rexford Jay Tibbens, Bainbridge Island, WA (US); Robert Lewis Callum, Bainbridge Island, WA (US); David Charles Mondul, Maple Valley, WA (US)

(73) Assignee: Amazon Technologies, Inc., Seattle, WA (US)

( * ) Notice: Subject to any disclaimer, the term of this patent is extended or adjusted under 35 U.S.C. 154(b) by 166 days.

(21) Appl. No.: 14/496,301

(22) Filed: Sep. 25, 2014

(51) Int. Cl.
| | |
|---|---|
| *B65G 67/02* | (2006.01) |
| *B65G 63/00* | (2006.01) |
| *B65D 88/02* | (2006.01) |
| *B65G 69/24* | (2006.01) |
| *B65D 90/12* | (2006.01) |

(52) U.S. Cl.
CPC .......... *B65G 63/002* (2013.01); *B65D 88/027* (2013.01); *B65D 90/125* (2013.01); *B65G 67/02* (2013.01); *B65G 69/24* (2013.01)

(58) Field of Classification Search
CPC ... B65D 88/027; B65D 90/125; B65G 63/002; B65G 63/022; B65G 67/02; B65G 69/24
See application file for complete search history.

(56) References Cited

U.S. PATENT DOCUMENTS

| | | | | |
|---|---|---|---|---|
| 3,722,716 | A * | 3/1973 | Tantlinger | B60P 1/025 180/414 |
| 3,753,506 | A * | 8/1973 | Palmer | B65F 9/00 100/215 |
| 3,834,562 | A * | 9/1974 | Norrie | B65G 69/008 14/71.3 |
| 5,662,450 | A * | 9/1997 | Roberts | B60P 1/6481 414/347 |
| 5,785,591 | A * | 7/1998 | Payne | B65D 88/121 220/1.5 |
| 5,971,692 | A * | 10/1999 | Rae | B65G 69/006 14/69.5 |
| 6,293,689 | B1 * | 9/2001 | Guntert, Jr. | B28C 9/0418 366/2 |
| 6,698,655 | B2 * | 3/2004 | Kondo | G06Q 10/087 235/375 |
| 6,862,847 | B2 * | 3/2005 | Bigelow | E04B 1/34321 220/1.5 |

(Continued)

*Primary Examiner* — James Keenan
(74) *Attorney, Agent, or Firm* — Thomas | Horstemeyer, LLP (57) ABSTRACT

Disclosed are various embodiments for a mobile crossdock system comprising one or more containers aligned in a configuration to form a mobile crossdock for mobile crossdock operations. The one or more containers are detachably attached to a platform such as a vehicle trailer. Further, the one or more containers may comprise a first side having a first plurality of openings and a second side having a second plurality of openings. A plurality of doors are aligned with the first plurality of openings and the second plurality of openings and are configured to move between a closed position and an open position. A plurality of ramps are configured to lift or raise a rear end of a vehicle to a position where a cargo area of the vehicle is substantially aligned with a floor of the mobile crossdock.

20 Claims, 9 Drawing Sheets

(56) References Cited

U.S. PATENT DOCUMENTS

| | | | | |
|---|---|---|---|---|
| 7,292,989 | B2* | 11/2007 | DeMaggio | G06Q 10/0631 |
| | | | | 705/7.12 |
| 7,454,811 | B1* | 11/2008 | Stotka | B65G 69/30 |
| | | | | 14/69.5 |
| 7,704,032 | B2* | 4/2010 | Rash | B60P 1/6445 |
| | | | | 254/45 |
| 8,424,802 | B2* | 4/2013 | Tripier-Larivaud | B63B 35/52 |
| | | | | 244/114 R |
| 8,702,366 | B2* | 4/2014 | Campbell | B65G 67/02 |
| | | | | 414/343 |
| 9,457,970 | B1* | 10/2016 | Zevenbergen | B65G 67/02 |
| 2004/0064385 | A1* | 4/2004 | Tamaki | G06Q 10/0875 |
| | | | | 705/29 |

* cited by examiner

MOBILE CROSSDOCK

BACKGROUND

Items being shipped from a source to a destination may be transferred from one vehicle to another during a shipment of the items. For example, items on a large tractor trailer inbound to a large metropolis may be separated and moved into smaller delivery vehicles for delivery to smaller cities. Separating and moving the items on the tractor trailer requires a facility. Given a need for productivity and speed in a supply chain, the movement of items from one vehicle to another remains problematic in shipping logistics.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a mobile crossdock system that facilitates mobile crossdock operations. As discussed above, items being shipped from a source to a destination may be transferred from one vehicle to another during a shipment of the items. For example, items on a large tractor trailer inbound to a large metropolis may be separated and moved into smaller delivery vehicles for delivery to smaller cities. Separating and moving the items on the tractor trailer requires a facility. Given a need for productivity and speed in a supply chain, the movement of items from one vehicle to another remains problematic in shipping logistics.

The permanency and immovability associated with brick and mortar facilities has the negative effect of requiring incoming vehicles and outbound vehicles to travel unnecessary lengths to transfer materials at the brick and mortar facilities. In addition, customer demand varies greatly in particular locations and erecting a permanent structure is time consuming and expensive. Thus, an immobile and immovable warehouse creates additional logistical expenses, such as increased fuel costs, driver time, and construction costs for building stationary brick and mortar crossdocks. Further, natural disasters can prevent access to brick and mortar warehouses.

Accordingly, a crossdock system may be mobile and capable of being transported using one or more vehicles. According to various embodiments as will be described herein, a mobile crossdock system may comprise a mobile container detachably attached to a platform, wherein at least one side of the mobile container has a plurality of openings allowing for crossdock operations. Such operations may include unloading materials from an inbound vehicle, dividing or consolidating the materials, and loading the materials into an outbound vehicle. The platform may be configured such that the mobile container may be readily removable from the platform. In various embodiments as will be described herein, the platform may comprise a vehicle trailer.

Each opening on the mobile container may include a vertically or horizontally closing door that protects and isolates an interior of the mobile container from an external environment. According to various embodiments, the doors may be configured to move from a closed vertical position to an open vertical position or from a closed horizontal position to an open horizontal position. Further, the mobile crossdock system may comprise a plurality of ramps configured at a height that causes a rear end of a vehicle to adjust to a position where a bed of the delivery vehicle is substantially aligned with a floor of the mobile container.

In the following discussion, a general description of the mobile crossdock system and its components is provided, followed by a discussion of the operation of the same.

Figure 1:
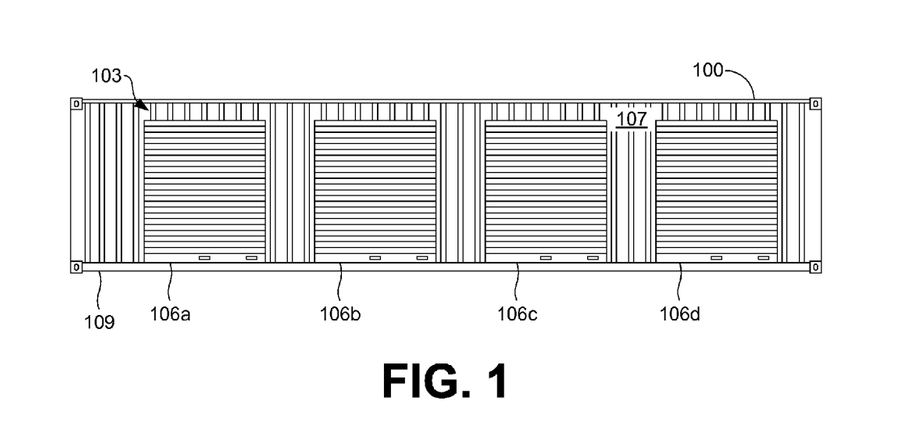
FIG. 1 is a drawing of a mobile crossdock according to various embodiments of the present disclosure.

With reference to FIG. 1, shown is a mobile crossdock 100 according to various embodiments of the present disclosure. A structure 103 of the mobile crossdock 100 may include one or more containers, such as a modified intermodal freight container. Accordingly, the structure 103 of the mobile crossdock 100 may be constructed from steel, aluminum, plastic, wood, or any combination of materials and, in some embodiments, the mobile crossdock 100 may comprise a uniform structure. According to various embodiments, the length of the mobile crossdock 100 may range from eight to fifty-six feet while the height of the mobile crossdock 100 may range from eight to ten feet or the mobile crossdock 100 may have other dimensions. To conform to existing shipping infrastructure (e.g., cranes, vehicle trailers, forklifts, helicopter lifts), the mobile crossdock 100 may have a length of twenty feet, forty feet, or eighty feet and may have a height of eight feet, eight feet and six inches, or other heights.

The structure 103 of the mobile crossdock 100 may comprise a vertical stacking of two or more containers, thereby creating a taller mobile crossdock 100. For example, two containers, each having a height of eight feet, may be vertically stacked to form a structure 103 of a mobile crossdock 100 having a height of sixteen feet assuming a bottom portion of the top container and a top portion of the bottom container are opened or removed. Similarly, the structure 103 of the mobile crossdock 100 may comprise a horizontal alignment of two or more containers to create a longer mobile crossdock 100. For example, two containers, each having a length of thirty-five feet, may be horizontally aligned to form a structure 103 of a mobile crossdock 100 having a length of seventy feet.

The mobile crossdock 100 may comprise a plurality of doors 106a . . . 106d (collectively doors 106) on at least one lateral side 107 of the mobile crossdock 100, wherein each of the doors 106 is aligned with an opening of the mobile crossdock 100. According to various embodiments, the doors 106 may be configured to be opened vertically or horizontally to save space, although standard front-swinging or rear-swinging doors 106 may be employed. As may be appreciated, a number of the openings on the mobile crossdock 100 may vary based on a width of the openings and a length of the one or more structures 103 of the mobile crossdock 100. The mobile crossdock 100 may further comprise a base 109 configured to permanently affix or detachably attach to a fixed or movable platform (not shown).

Assuming the structure 103 of the mobile crossdock 100 comprises a standard intermodal freight container with a length of forty feet, in various embodiments, the width of each of the plurality of doors 106 on a mobile crossdock having four doors on each lateral side may be approximately seventy-four inches, with thirty-six inches being the width of the sections between the doors 106 and between the doors 106 and the ends of the mobile crossdock. However, the plurality of doors 106 may have any suitable dimensions, and a single mobile crossdock 100 may have doors of varying sizes to accommodate various types of vehicles that may interface with the mobile crossdock 100.

Figure 2:
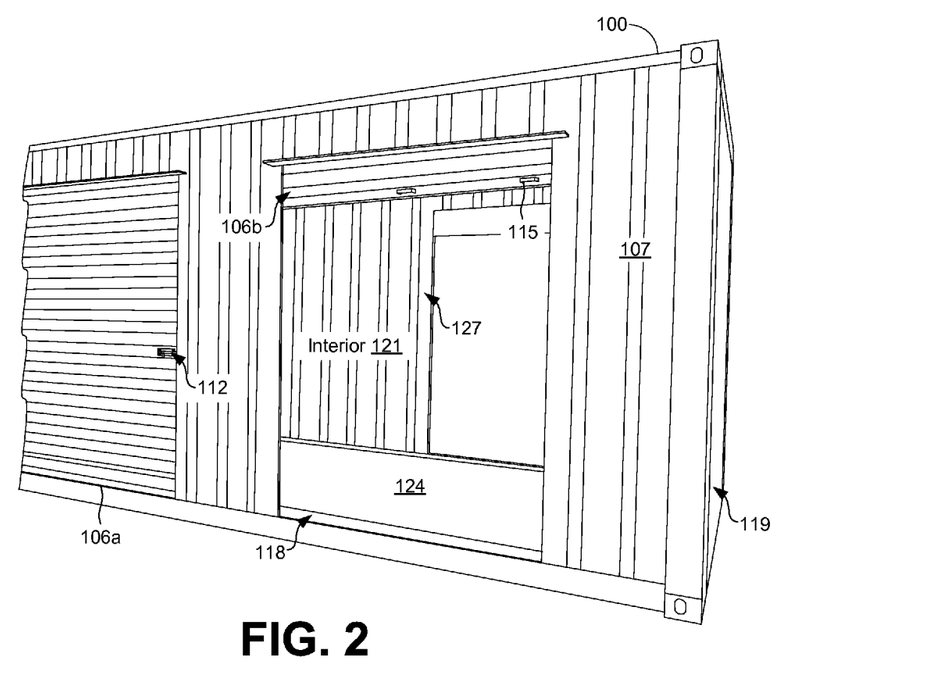
FIG. 2 is a drawing of the mobile crossdock of FIG. 1 having at least one door in a vertically open position according to various embodiments of the present disclosure.

Referring next to FIG. 2, shown is an enhanced view of a side of the mobile crossdock 100 according to various embodiments described herein. In the non-limiting example of FIG. 2, a first one of the plurality of doors 106a is shown in a vertically closed position while a second one of the plurality of doors 106b is shown in a vertically open position. According to various embodiments, each of the doors 106 may comprise one or more exterior locks 112 to prevent unauthorized access to the mobile crossdock 100. Each of the doors 106 may comprise one or more exterior handles 115 or interior handles (not shown) to facilitate opening or closing of the door 106.

When one or more of the doors 106 are in an open position, one or more openings 118 are created on at least one lateral side 107 or a broad side of the mobile crossdock 100, thereby allowing crossdock operations to be conducted. The lateral side 107 or the broad side of the mobile crossdock 100 may comprise, for example, a side with a length longer than one or more ends 119 of the mobile crossdock 100. In the non-limiting example of FIG. 2, the opening 118 of the mobile crossdock 100 provides a view of an interior 121 of the mobile crossdock. The interior 121 may comprise a floor 124 and one or more interior walls 127, as will be described in greater detail below. Also shown in FIG. 2, the opening 118 on a first side of the mobile crossdock 100 may be directly aligned with an opening 118 on the other side of the mobile crossdock 100 to facilitate quickly moving shipping materials from the first side of the mobile crossdock 100 to the other side of the mobile crossdock 100. However, in various embodiments, the opening 118 on the first side of the mobile crossdock 100 does not need to be directly aligned with the opening 118 on the other side of the mobile crossdock 100 (and indeed does not need to be across from any opening on the other side of the mobile crossdock 100). The space between the openings 118 in the interior 121 of the mobile crossdock 100 may be used for storage or movement of shipping materials or crossdock operation items (e.g., dollies and handcarts).

Figure 3:
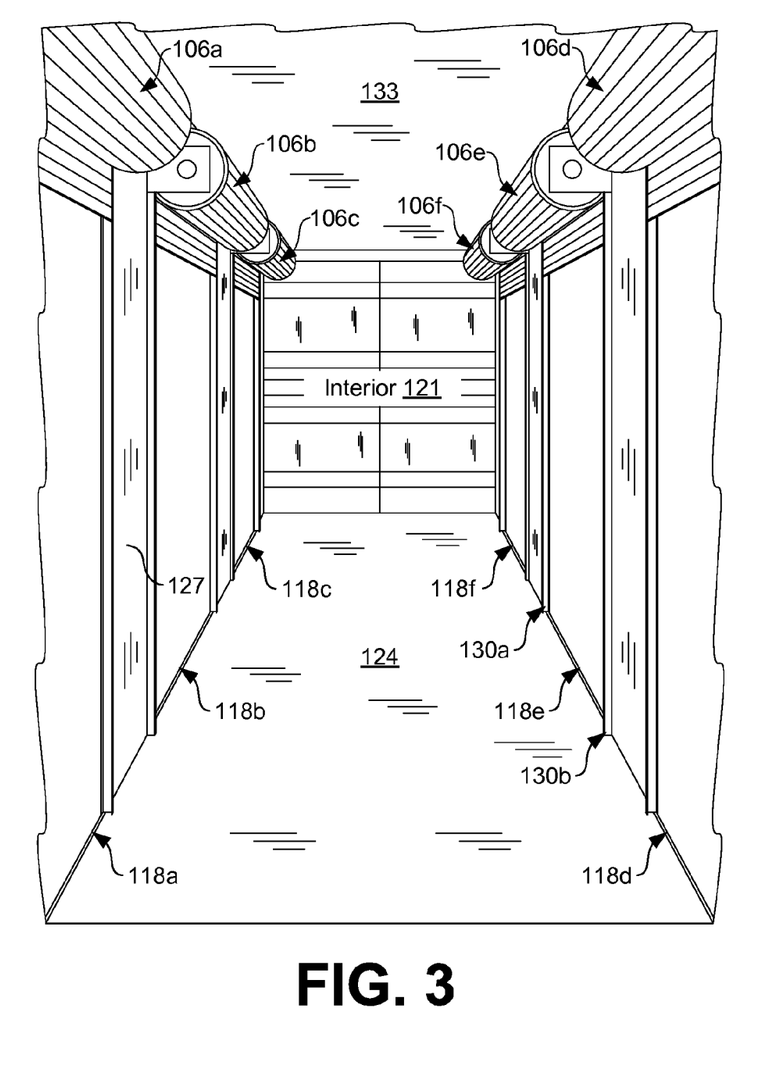
FIG. 3 is a drawing of an interior view of the mobile crossdock of FIG. 1 having a plurality of doors in a vertically open position according to various embodiments of the present disclosure.

Turning now to FIG. 3, shown is the interior 121 of the mobile crossdock 100 according to various embodiments of the present disclosure. In the non-limiting example of FIG. 3, the plurality of doors 106a . . . 106f are shown in a vertically opened position, thereby creating a plurality of openings 118a . . . 118f (collectively openings 118). According to various embodiments, the doors 106 may comprise an overhead rolling door that retracts the door 106 into a coil or roll, saving valuable space in the interior 121 of the mobile crossdock 100. However, in alternative embodiments, the doors 106 may comprise horizontally sliding doors and/or front-swinging and rear-swinging doors 106. In various embodiments, the doors 106 may be automated and electrically powered such that a switch or a wireless remote may initiate an automatic opening or closing of the doors 106. Conversely, the doors 106 may be manual, requiring a crossdock operator to pull/push open or pull/push close the doors 106. Further, the doors 106 may be guided by one or more tracks 130a . . . 130b (collectively tracks 130) that assist in moving the doors 106 to a closed or open position.

The floor 124 of the mobile crossdock 100 may comprise steel, aluminum, plastic, linoleum, wood, any similar materials, or a combination thereof. Further, the floor 124 may comprise a material or a coating of a material that prevents slippage during wet conditions. The floor 124 may be of such a height that causes a top of the floor 124 to align with a bed of a delivery vehicle interfacing with one or more of the openings 118, as will be discussed in greater detail below.

In various embodiments, the interior 121 of the mobile crossdock 100 may comprise one more lights (not shown) for low light or nighttime crossdock operations. Accordingly, the one or more lights may be fixed to a ceiling 133 of the mobile crossdock 100 or the interior walls 127 of the mobile crossdock 100. The lights may be operated by a switch or a wireless remote and powered electrically by a power source such as a generator, a battery, or a physical connection to an electrical grid, if available. In the event the mobile crossdock 100 includes a battery to power various electrical components, such as the lights, the battery may be charged using one or more solar panels positioned on a top of the mobile crossdock 100 or in an adequate location relative to the mobile crossdock 100. In various embodiments, an exterior light sensor may automatically cause one or more lights in the interior 121 of the mobile crossdock 100 to turn on when in a low light condition.

According to various embodiments, the ceiling 133 of the mobile crossdock 100 may comprise one more transparent panels (not shown) to allow artificial or natural light from the exterior of the mobile crossdock 100 into the interior 121. In alternative embodiments, the ceiling 133 may comprise a removable panel (whether transparent or opaque) that allows artificial or natural light and ventilation for the interior 121 of the mobile crossdock 100, for example, when the panel is removed.

In various embodiments, the interior 121 of the mobile crossdock 100 may comprise one more fans or air conditioning units (not shown) to provide cooling and ventilation to the interior 121 of the mobile crossdock 100. To this end, the fans may comprise ceiling fans mountable to the ceiling 133 or may comprise horizontal box fans mountable to the interior walls 127. An air conditioning unit or fan may be placed at one of the ends 119 (FIG. 2) of the mobile crossdock 100 to prevent interference with crossdock operations. The fans or air conditioning unit may be operated by a pull string, a switch, or a wireless remote and may be electrically powered by a power source such as a generator, a battery, or a physical connection to an electrical grid, if available.

Figure 4:
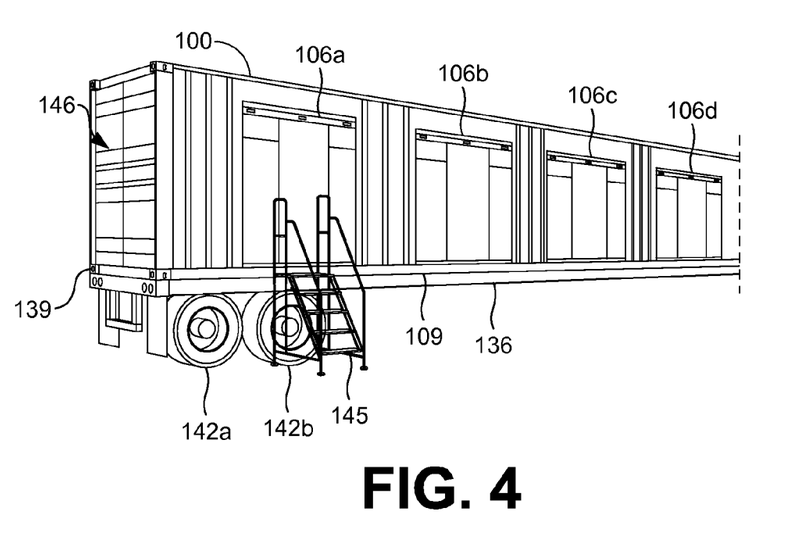
FIG. 4 is a drawing of an exterior view of the mobile crossdock of FIG. 1 having a plurality of doors in a vertically open position according to various embodiments of the present disclosure.

Moving on to FIG. 4, shown is another exterior view of the mobile crossdock 100 according to various embodiments of the present disclosure. As discussed above, the structure 103 (FIG. 1) of the mobile crossdock 100 may include one or more containers, such as a modified intermodal freight container. Accordingly, the mobile crossdock 100 may be positioned on a vehicle trailer 136, such as one configured to carry a standard intermodal freight container. In the non-limiting example of FIG. 4, the mobile crossdock 100 comprises one forty foot container on a forty foot vehicle trailer 136. As may be appreciated, the base 109 of the mobile crossdock 100 may be detachably attached to the vehicle trailer 136 using a crane, a forklift, a helicopter, or similar equipment.

Moreover, the mobile crossdock 100 may be detachably attached to the vehicle trailer 136 using one or more twist locks 139. As a non-limiting example, before the mobile crossdock 100 is fixed onto the vehicle trailer 136, the four twist locks 139 on the mobile crossdock 100 are placed on the vehicle trailer 136 such that a pin affixed to the vehicle trailer 136 projects vertically into each of the four twist locks 139 located at each corner of the mobile crossdock 100. A manual rotation of the pin causes a top portion of the pin to pivot by 90 degrees, causing the respective corner of the mobile crossdock 100 to affix to the vehicle trailer 136.

Depending on the length of the mobile crossdock 100, one or more mobile crossdocks 100 may be placed on a single vehicle trailer 136. For example, assuming the length of the mobile crossdock 100 is twenty feet, two mobile crossdocks 100 may fit on a single forty foot vehicle trailer 136. As may be appreciated, a different pin configuration is required based on the number of mobile crossdocks 100 on a single vehicle trailer 136.

As shown in the non-limiting example of FIG. 4, the vehicle trailer 136 comprises one or more wheels 142a . . . 142b (collectively wheels 142) that facilitates a transfer of the mobile crossdock 100 when pulled by a capable vehicle, such as a truck or a semi-trailer truck. If the wheels 142 comprise one or more inflatable tires, an air pressure of the tires may be dynamically adjusted to increase or decrease a height of the mobile crossdock 100 from a surface, as will be discussed in greater detail below.

As discussed above, the mobile crossdock 100 comprises the plurality of doors 106a . . . 106d (collectively doors 106), wherein each of the doors 106 is aligned with an opening 118 (FIG. 2) of the mobile crossdock 100. According to various embodiments, the doors 106 on a first side of the mobile crossdock 100 may or may not be directly aligned with the doors 106 on the second side of the mobile crossdock 100 to facilitate crossdock operations, such as moving materials from a first delivery vehicle to a second delivery vehicle, as may be appreciated.

When the vehicle trailer 136 is in use as a platform for the mobile crossdock 100 during crossdock operations, a rotation or other movement of the wheels 142 of the vehicle trailer 136 may be inhibited using hydraulic or electric brakes, one or more suitable wheel chocks, and/or the weight of the mobile crossdock 100 with the vehicle trailer 136. A ladder 145, a hydraulic lift, an electric lift, or a similar device, may be used to provide ingress and/or egress to the interior 121 of the mobile crossdock 100. The ladder 145 may be detachably attached to the structure 103 of the mobile crossdock 100 at any of the plurality of openings 118 to provide additional stability and support.

At least one of the ends 146 (FIG. 2) of the mobile crossdock 100 may comprise cargo doors that are accessible on the exterior of the mobile crossdock 100, such as those used in intermodal freight containers. In various embodiments, the cargo doors may be replaced with a permanently closed and uniform end 146. In alternative embodiments, at least one end 146 of the mobile crossdock 100 may be used as an ingress and/or egress to the interior 121 of the mobile crossdock 100 using, for example, the ladder 145, a hydraulic lift, an electric lift, or a similar device.

Figure 5:
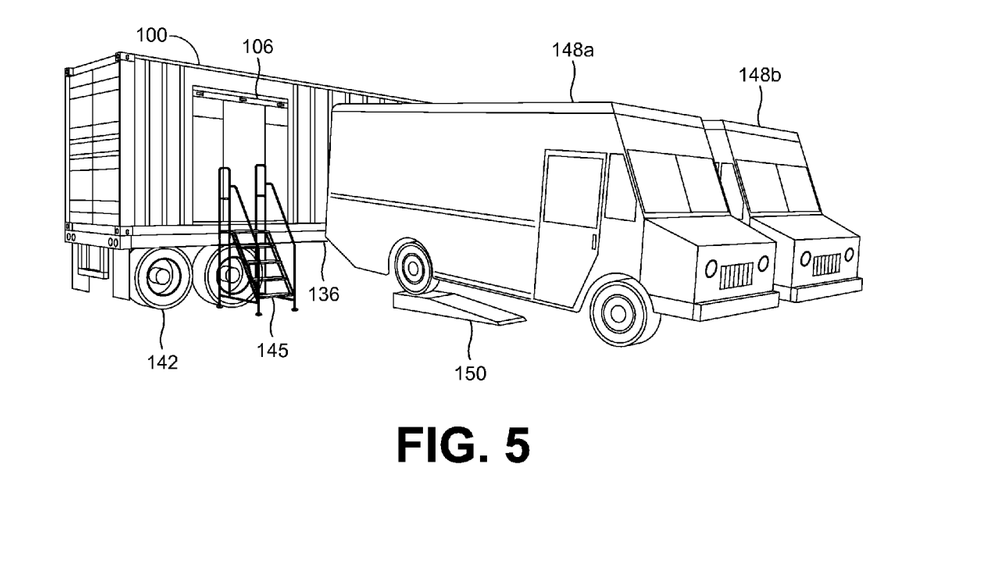
FIG. 5 is a drawing of the mobile crossdock of FIG. 1 during exemplary crossdock operations according to various embodiments of the present disclosure.

Referring next to FIG. 5, shown is yet another exterior view of the mobile crossdock 100 according to various embodiments of the present disclosure. As discussed above, the structure 103 of the mobile crossdock 100 may include one or more containers, such as a modified intermodal freight container. Accordingly, the mobile crossdock 100 may be positioned on a vehicle trailer 136, such as one configured to carry a standard intermodal freight container. As may be appreciated, the base 109 (FIG. 1) of the mobile crossdock 100 may be detachably attached to the vehicle trailer 136 using a crane, a forklift, a helicopter, or similar equipment.

In the non-limiting example of FIG. 5, a plurality of delivery vehicles 148a . . . 148b (collectively delivery vehicles 148) may position themselves such that the delivery vehicles 148 may be loaded or unloaded. To this end, a driver or operator of each of the delivery vehicles 148 may reverse or position an end of the delivery vehicle 148 in a direction towards the mobile crossdock 100 such that a bed or cargo area of the delivery vehicles 148 faces the mobile crossdock 100. As may be appreciated, depending on the dimensions of a delivery vehicle 148 and the dimensions of the mobile crossdock 100, a variation may exist between the floor 124 (FIG. 2) of the mobile crossdock 100 and the bed of the delivery vehicle 148. Accordingly, one or more ramps 150 may be provided and employed to lift, raise, position, or adjust a cargo area of the delivery vehicle 148 to substantially align the bed of the delivery vehicle with the floor 124 of the mobile crossdock 100. In lieu of, or in addition to the ramps 150, the air pressure of tires on the wheels 142 of the vehicle trailer 136 (or the wheels of the delivery vehicle 148) may be dynamically adjusted to increase or decrease a height of the mobile crossdock 100 from a surface.

In various embodiments, the mobile crossdock 100 may be positioned on a platform configured to dynamically adjust a height of the mobile crossdock 100 from the ground. Similarly, the platform may comprise a kneeling bus platform that is capable of raising or lowering a side, a corner, or an entirety of the mobile crossdock 100 relative to at least one of the delivery vehicles 148. Accordingly, the kneeling bus platform may comprise one or more hydraulic, electrical, or pneumatic devices capable of lowering or raising the height of the mobile crossdock 100 from the ground or from a height of a cargo area of at least one of the delivery vehicles 148. In a non-limiting example, by manipulating a button associated with the mobile crossdock 100, an operator is able to release gas from a pneumatic device causing a side, corner, or an entirety of the mobile crossdock 100 to lower, thereby allowing operators of the mobile crossdock 100 to move freely from a cargo area of the delivery vehicle 148 to the interior 121 of the mobile crossdock 100 (e.g., without having to step up or down from the mobile crossdock 100). Once crossdock operations have been performed, the switch may be further manipulated by the operator, and the pneumatic device causes the height of the mobile crossdock 100 to increase to a normal operation height or to an ideal travel height.

While a driver of one of the delivery vehicles 148 may be able to position the bed of the delivery vehicle 148 flush (or relatively even) with the mobile crossdock 100, the driver is unlikely to do so without causing a collision that may damage the mobile crossdock 100 and/or the delivery vehicle 148. Accordingly, a dock plate, dock leveler, or dock board (not shown) may be provided to bridge a gap between the bed of the delivery vehicle 148 and the mobile crossdock 100. According to various embodiments, the floor 124 of the mobile crossdock 100 may comprise one or more receptacles that cause the dock plate, dock leveler, or dock board to detachably attach and/or conform to the floor 124 of the mobile crossdock 100. In various embodiments, the dock plate, dock leveler, or dock board may comprise a retractable portion fixed to the mobile crossdock 100 or the delivery vehicle 148 as opposed to a component that is detachably attached to the mobile crossdock 100 and/or the delivery vehicle 148.

As discussed above, the mobile crossdock 100 comprises the plurality of doors 106a . . . 106d (collectively doors 106), wherein each of the doors 106 is aligned with an opening 118 (FIG. 2) of the mobile crossdock 100. According to various embodiments, the doors 106 on a first side of the mobile crossdock 100 may or may not be directly aligned with the doors 106 on the second side of the mobile crossdock 100 to facilitate crossdock operations, such as moving materials from a first delivery vehicle to a second delivery vehicle, as may be appreciated.

When the vehicle trailer 136 is in use as a platform for crossdock operations, a rotation of the wheels 142 of the vehicle trailer 136 may be inhibited using hydraulic or electric brakes, one or more suitable wheel chocks, and/or the weight of the mobile crossdock 100 with the vehicle trailer 136. Similarly, when one of the delivery vehicles 148 is unloading materials or is positioned on the ramps 150, a rotation of the wheels of the delivery vehicle 148 may be inhibited using hydraulic or electric brakes, one or more suitable wheel chocks, and/or the weight of the delivery vehicle 148.

The ladder 145, a hydraulic lift, an electric lift, or a similar device, may be used to provide ingress and/or egress to the interior 121 of the mobile crossdock 100. The ladder 145 may be detachably attached to the structure 103 (FIG. 1) of the mobile crossdock to provide additional stability and support.

Next, a general description of the operation of the various components of the system of the mobile crossdock 100 during exemplary crossdock operation is provided. To begin, it is assumed that the mobile crossdock 100 is positioned in a location where crossdock operations can be conducted. As a non-limiting benefit, the mobile crossdock 100 can facilitate crossdock operations in vacant or partially vacant parking lots, grass fields, highways, disaster areas, or similar areas with little to no infrastructure. Depending on the conditions, one or more of the plurality of doors 106 may be placed in an open position, thereby creating one or more openings 118 for delivery vehicles 148 or for crossdock worker ingress and egress. Similarly, based on the conditions, one or more lights, fans, or air conditioning units, may be powered using a power source such as a generator, a battery, or a physical connection to an electrical grid, if available.

To begin performing crossdock operations, a driver reverses or positions a delivery vehicle 148 at a vacant one of the openings 118 (FIG. 2). As may be appreciated, delivery vehicles 148 may vary in size from mini-vans to tractor trailers. Accordingly, smaller vehicles may utilize the ramps 150 provided to position the delivery vehicle 148 such that a bed of the delivery vehicle 148 is substantially aligned with the floor 124 of the mobile crossdock 100.

Next, a crossdock worker or a driver of the delivery vehicle 148 may provide a dock plate, a dock leveler, a dock board, or a similar device, across a gap between the bed of the delivery vehicle 148 and the floor 124 of the mobile crossdock 100. The dock plate, dock leveler, dock board, or similar device, may be placed or affixed in a receptacle or a groove in the floor 124 that causes the dock plate, dock leveler, dock board, or similar device to detachably attach and/or conform to the floor 124 of the mobile crossdock 100.

Subsequently, the crossdock workers may either remove materials, such as shipping crates or packages, from the delivery vehicle 148 for placement in the mobile crossdock 100 or another delivery vehicle 148. To this end, a crossdock worker may use a dolly, a handcart, or an appropriately-sized forklift, if needed, to move a shipping crate or package from a first delivery vehicle 148a to the mobile crossdock or a second delivery vehicle 148b.

As a non-limiting example, a large tractor trailer may comprise a plurality of shipping crates destined for various cities in a region. The contents of the tractor trailer may be divided up and moved by crossdock workers into smaller delivery vehicles 148 destined for the various cities. Alternatively, the contents of several smaller delivery vehicles 148 may be consolidated and coalesced into one or more larger delivery vehicles 148 for various delivery routes.

After dropping off or obtaining the required shipping materials, the dock plate, dock leveler, dock board, or similar device between the vehicle 148 and the floor 124 of the mobile crossdock 100 may be disengaged. The driver of the delivery vehicle 148 may navigate down the ramps 150, if applicable, and navigate away from the mobile crossdock 100 (e.g., proceed to conduct a delivery route). Assuming the mobile crossdock operations are complete, the plurality of doors 106 of the mobile crossdock 100 may be automatically or manually closed to protect the interior 121 of the mobile crossdock 100 from the exterior environment (e.g., rain, wind, or dirt). Any electrical components (e.g., lights, fans, automatic doors) may be turned off to conserve power.

Figure 6:
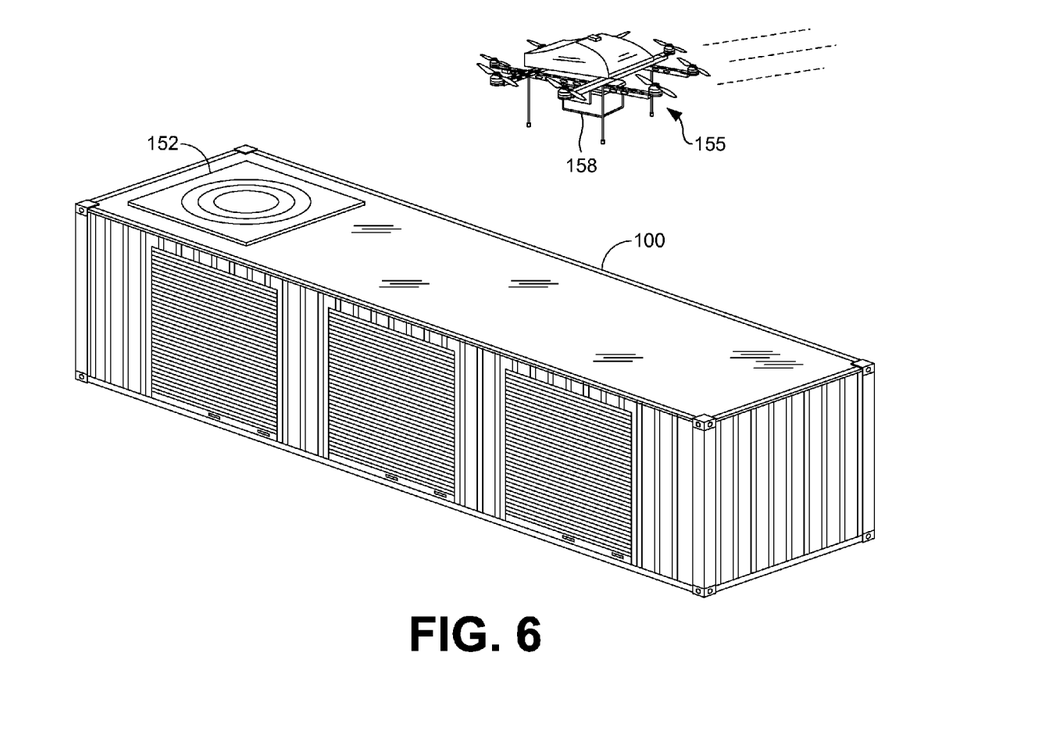
FIG. 6 is a drawing of the mobile crossdock of FIG. 1 including a drone platform according to various embodiments of the present disclosure.

Referring next to FIG. 6, shown is a drawing of the mobile crossdock of FIG. 1 comprising a drone platform 152 or a landing pad configured to facilitate delivery of materials to the mobile crossdock 100 by one or more drones 155 or other aerials vehicle according to various embodiments of the present disclosure. In the non-limiting example of FIG. 6, a drone 155 may comprise an autonomous, semi-autonomous, or manually controlled aerial vehicle. In various embodiments, the drone 155 may further comprise a cargo hold 158 comprising materials used in crossdock operations. To this end, the mobile crossdock 100 may comprise the drone platform 152 on a roof of the mobile crossdock or in other proximate locations.

In various embodiments, the drone platform 152 may be located on the ground near the mobile crossdock 100. However, in alternative embodiments, the drone platform 152 may be located in the interior 121 (FIG. 2) of the mobile crossdock 100. To this end, an opening 118 may be created in the roof of the mobile crossdock 100, wherein the opening 118 is substantially large enough for the drone 155 to navigate from above the mobile crossdock 100 to the interior 121 of the mobile crossdock 100. Similarly, the drone 155 may navigate to a drone platform 152 in the interior 121 of the mobile crossdock 100 via the openings 118 on the broad or lateral sides of the mobile crossdock 100.

The drone platform 152 may comprise a platform elevated from the structure 103 (FIG. 1) of the mobile crossdock 100. In this non-limiting example, the drone platform 152 may be detachably attached at various locations on the roof of the mobile crossdock 100 or may be positioned in locations proximate to the mobile crossdock 100. The drone platform 152 may be made accessible to an operator of the mobile crossdock 100 by a ladder 145 (FIG. 4), an electric lift, a hydraulic lift, and/or similar device. Further, the drone platform 152 may be made accessible via one or more openings (not shown) on a roof of the mobile crossdock 100 such that operators of the mobile crossdock 100 may receive materials from the drone 155 and/or provide materials to the drone 155.

In various embodiments, the mobile crossdock 100 is positioned on a platform configured to dynamically adjust a height of the mobile crossdock 100 from the ground using hydraulic, electrical, and/or pneumatic devices. Accordingly, the height of the mobile crossdock 100 may be adjusted dynamically (e.g., automatically, semi-automatically, or manually through an operator) such that the drone platform 152 is accessible for crossdock operations. For example, by lowering a height of the mobile crossdock 100 via the platform, accessing the roof of the mobile crossdock 100 may be facilitated. Further, the platform may comprise a kneeling bus platform that is capable of raising or lowering a side, a corner, or an entirety of the mobile crossdock 100. In various embodiments, the drone platform 152 may be illuminated via one or more light sources to make the drone platform 152 recognizable in conditions with no or little light.

Figure 7:
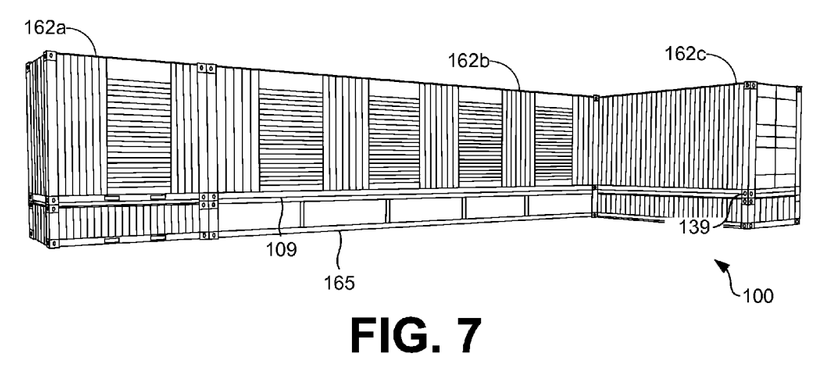
FIG. 7 is a drawing illustrating a configuration of a mobile crossdock according to various embodiments of the present disclosure.

Referring next to FIG. 7, shown is an arrangement of a plurality of containers 162a . . . 162c (collectively containers 162) that may be arranged to form a mobile crossdock 100 in an L-shaped configuration according to various embodiments of the present disclosure. In the non-limiting example of FIG. 7, the first container 162a is substantially aligned lengthwise with the second container 162b. That is, an end 119 (FIG. 2) of the first container 162a may be coupled with an end 119 of the second container 162b using a securing component or may be placed in a close proximity and may be bridged by a dock plate, dock leveler, dock board, or similar device. Further, an opposite end 119 of the second container 162b is coupled to or placed in a close proximity (and may be bridged by a dock plate, dock leveler, dock board, or similar device) to an opening 118 (FIG. 2) on a lateral side 107 of the third container 162c. Accordingly, the opening 118 on the lateral side 107 of the third container 162c may consist of a size substantially similar to a size of the end 119 of the second container 162b to facilitate crossdock operations in the interior 121 (FIG. 2) of the mobile crossdock 100. In various embodiments, a portion of the mobile crossdock 100, including one or more containers 162 in the mobile crossdock 100, may be assigned independently or in a combination of containers 162 as a transfer area, storage area, storage compartment, refrigeration area, and/or office area. For example, the third container 162c may be dedicated as a storage area for shipping materials.

In the non-limiting example of FIG. 7, the base 109 of the mobile crossdock 100 may be positioned on a platform or a stationary platform 165 as opposed to a vehicle trailer 136 using a crane, a forklift, a helicopter, or similar equipment. However, in various embodiments, the configuration shown in FIG. 7 may utilize a plurality of vehicle trailers 136 as a platform, wherein the vehicle trailers 136 are in a similar predefined configuration. In various embodiments, the mobile crossdock 100 may be fixed to the stationary platform 165 by welding corners of the mobile crossdock 100 to the stationary platform 165. In alternative embodiments, the mobile crossdock 100 may be detachably attached to the stationary platform 165 using one or more twist locks 139. As a non-limiting example, before the mobile crossdock 100 is fixed onto the stationary platform 165, the twist locks 139 are placed on the stationary platform 165 such that a pin affixed to the stationary platform 165 projects vertically into each corner of the mobile crossdock 100. A rotation of the pin causes a top portion of the pin to pivot by 90 degrees, causing the respective corner of the mobile crossdock 100 to affix to the stationary platform 165. In various embodiments, the stationary platform 165 may comprise a hydraulic or electrical lift configured to dynamically adjust a height of the mobile crossdock 100 from the ground.

A height of the stationary platform 165 may be preconfigured such that the floor 124 (FIG. 2) of the mobile crossdock 100 substantially aligns with a cargo area or bed of a particular delivery vehicle 148. In various embodiments, a platform, such as the stationary platform 165, may comprise a hydraulic or electric platform capable of dynamically changing the height of the mobile crossdock 100 from the ground. Further, in various embodiments, an external roof structure may be placed over all or a portion of the mobile crossdock 100 or at junctions between two or more containers 162. As a further alternative, the base 109 of the mobile crossdock 100 may be positioned directly on the ground, e.g., in a partially vacant parking lot or other suitable areas capable of supporting the mobile crossdock 100, without use of any fixed or mobile structures such as stationary platforms 165 or vehicle trailers 136.

Figure 8A:
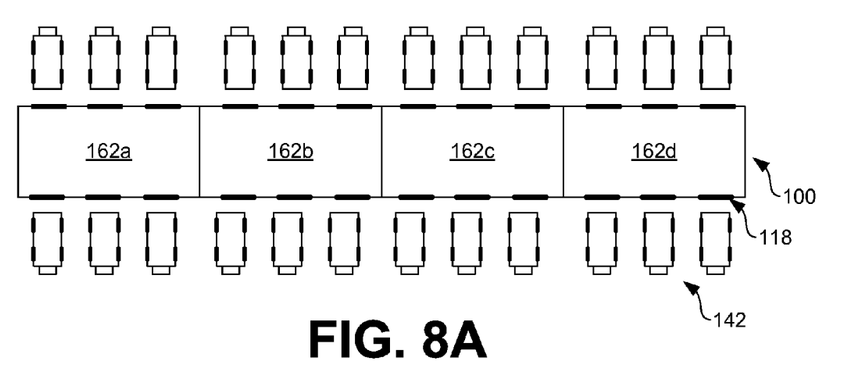
FIGS. 8A-B are drawings illustrating alternative configurations of a mobile crossdock according to various embodiments of the present disclosure.

Turning now to FIG. 8A, shown is an alternative arrangement of a plurality of containers 162a . . . 162d (collectively containers 162) that may be arranged to form a mobile crossdock 100 in an elongated configuration according to various embodiments of the present disclosure. In the non-limiting example of FIG. 8A, a first container 162a is aligned lengthwise with a second container 162b which is aligned lengthwise with a third container 162c, which is further aligned lengthwise with a fourth container 162c. That is, an end of the first container 162a may be coupled with an end of the second container 162b using a securing component or may be placed in a close proximity and may be bridged by a dock plate, dock leveler, dock board, or similar device. Similarly, an opposite end of the second container 162b may be coupled with an end of the third container 162c using a securing component or may be placed in a close proximity and may be bridged by a dock plate, dock leveler, dock board, or similar device, and so on until a complete and uniform mobile crossdock 100 is formed. As may be appreciated, the mobile crossdock 100 may comprise a variable number and size of openings 118 (FIG. 2) in variable positions throughout the mobile crossdock 100 as needed for particular crossdock operations.

Figure 8B:
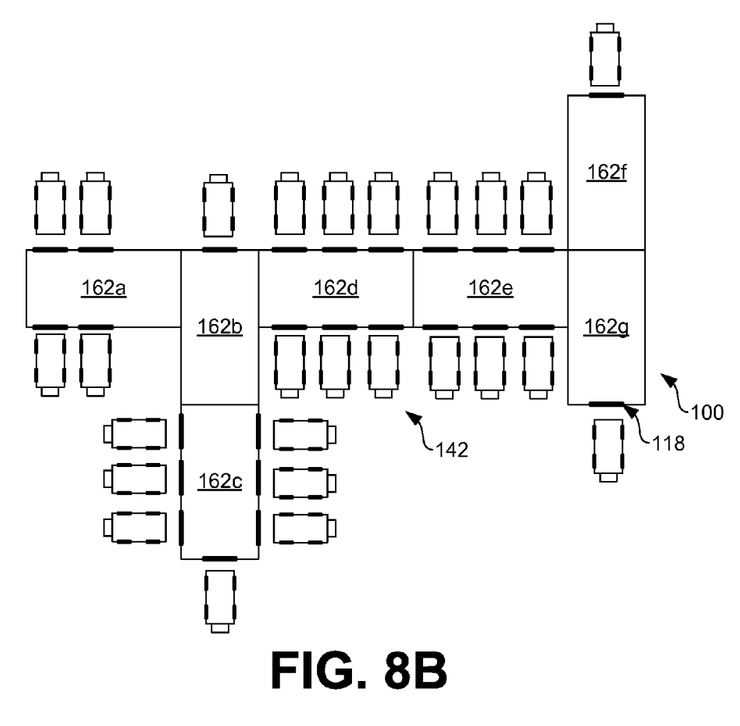

Turning now to FIG. 8B, shown is yet another alternative arrangement of a plurality of containers 162a . . . 162g (collectively containers 162) that may be arranged to form a mobile crossdock 100 in a variable configuration according to various embodiments of the present disclosure. In the non-limiting example of FIG. 8B, a first plurality of containers 162a . . . 162c form an L-shaped configuration which is coupled to a T-shaped configuration of a second plurality of containers 162d . . . 162g. Interfacing portions of adjacent containers 162 are coupled to one another using a securing component and/or are placed in a close proximity and may be bridged by a dock plate, dock leveler, dock board, or similar device. Although the configurations of FIGS. 7 and 8A show an L-shaped configuration and an elongated configuration, FIG. 8B shows that many configurations of the containers 162 are possible to form a uniform mobile crossdock 100. Moreover, the numbers, sizes and positions of the openings 118 (FIG. 2) on respective portions of the mobile crossdock 100 has a multitude of possibilities.

Figure 9:
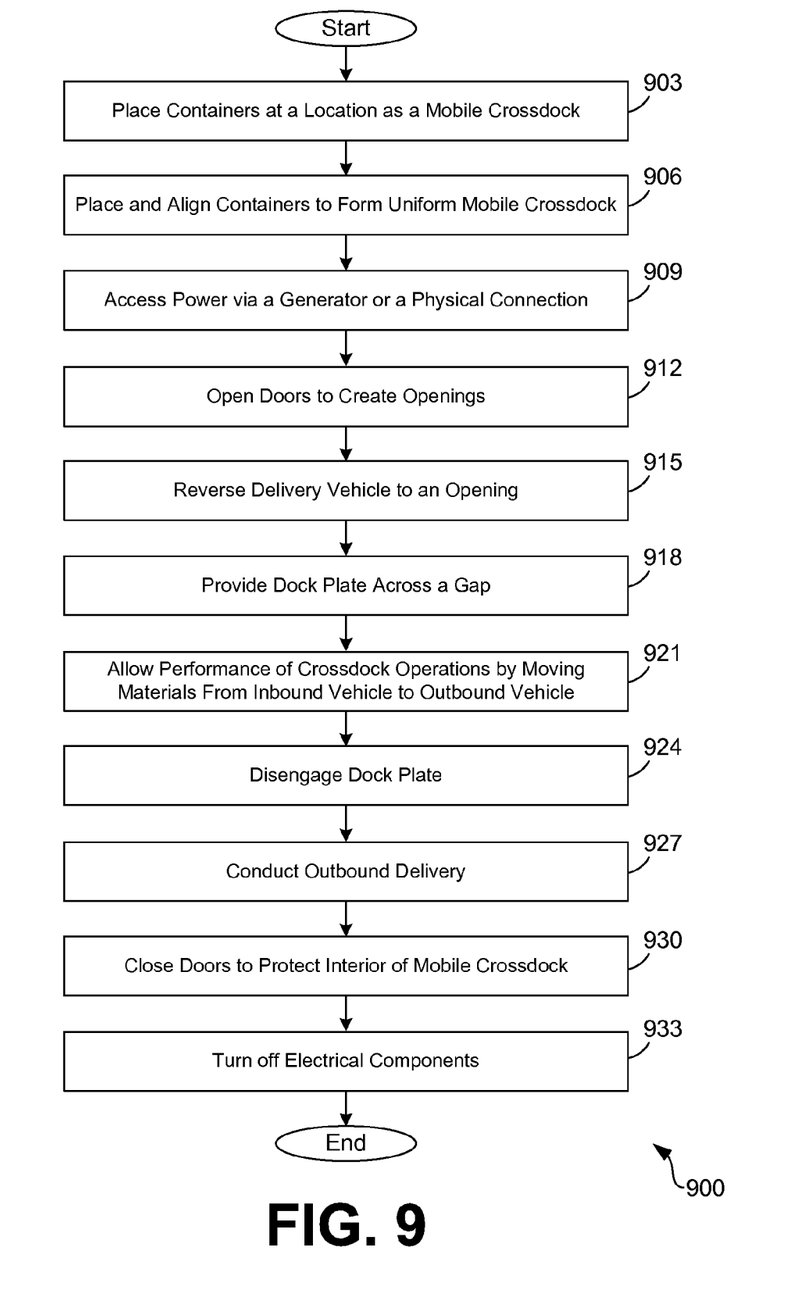
FIG. 9 is a flowchart illustrating one example of functionality implemented as portions of the mobile crossdock of FIG. 1 according to various embodiments of the present disclosure.

Referring next to FIG. 9, shown is a flowchart 900 that provides one example of the operation of a portion of the mobile crossdock 100 (FIG. 1) according to various embodiments. It is understood that the flowchart 900 of FIG. 9 provides merely an example of the many different types of functional arrangements that may be employed to implement the operation of the portion of the mobile crossdock 100 as described herein.

Beginning with 903, one or more containers 162 (FIG. 7) may be moved to or placed at a location as a mobile crossdock for crossdock operations. This may include determining that crossdock operations are needed at the location. Placing the one or more containers 162 at a location may include instructing the arrangement of the one or more of mobile containers 162 in a predefined configuration to create the mobile crossdock 100 for crossdock operations. The arrangement may include instructions to align at least one of the plurality of openings 118 of the plurality of mobile containers 162 with at least one of the plurality of openings 118 of other mobile containers 162. The one or more containers 162 may be moved to the location using one or more vehicle trailers 136, cranes, forklifts, suitable vehicles, or other equipment. As a non-limiting benefit, the mobile crossdock 100 can facilitate crossdock operations in vacant or partially vacant parking lots, grass fields, highways, disaster areas, or similar areas with little to no infrastructure.

In 906, the containers 162 are placed and/or aligned in an arrangement to form a uniform mobile crossdock 100 in a desired configuration for a particular crossdock operation. As discussed above, an end or opening 118 of each container 162 may be coupled to an end or an opening 118 (FIG. 2) of another container 162 using a securing component and/or may be placed in a close proximity and may be bridged by a dock plate, dock leveler, dock board, or similar device. By employing this arrangement, a multitude of configurations of the containers 162 are possible to form a uniform mobile crossdock 100. Moreover, the numbers, sizes and positions of the openings 118 on respective portions of the mobile crossdock 100 has a multitude of possibilities.

Next, in 909, various electrical components of the mobile crossdock 100 described herein may be powered via a power source such as a generator, a battery, or a physical connection to an electrical grid, if available at the location for the crossdock operation. For example, the lights, fans, air conditioning units, electric lifts, etc., may be powered using the power source. In 912, one or more doors 106 (FIG. 1) of the mobile crossdock 100 are moved to an open position, thereby creating one or more openings 118 (FIG. 2). To begin performing the crossdock operations, in 915, a driver reverses or positions a delivery vehicle 148 at a vacant one of the openings 118 (FIG. 2). As may be appreciated, delivery vehicles 148 may vary in size from mini-vans to tractor trailers. Accordingly, smaller vehicles may utilize the ramps 150 provided to lift or position the delivery vehicle 148 such that a cargo area or bed of the delivery vehicle 148 aligns with the floor 124 of the mobile crossdock 100. In addition, smaller vehicles may be positioned at openings 118 of correspondingly smaller size, whereas larger vehicles may be positioned at openings 118 of correspondingly larger size.

Next, in 918, a crossdock worker or a driver of the delivery vehicle 148 may provide a dock plate, a dock leveler, a dock board, or a similar device, across a gap between the cargo area or bed of the delivery truck 148 and the floor 124 of the mobile crossdock 100. The dock plate, dock leveler, dock board, or similar device, may be placed or affixed in a receptacle or a groove in the floor 124 that causes the dock plate, dock leveler, dock board, or similar device to detachably attach and/or conform to the floor 124 of the mobile crossdock 100.

Subsequently, in 921, a performance of crossdock operations are allowed. For example, the crossdock workers may either remove materials, such as shipping crates or packages, from the delivery vehicle 148 for placement in the mobile crossdock 100 or another delivery vehicle 148. To this end, a crossdock worker may use a dolly, a handcart, or an appropriately-sized forklift, if needed, to move a shipping crate or package from a first delivery vehicle 148 to the mobile crossdock 100 or a second delivery vehicle 148. As a non-limiting example, a large tractor trailer may comprise a plurality of shipping crates destined for various cities in a region. The contents of the tractor trailer may be divided up and moved by crossdock workers into smaller delivery vehicles 148 destined for the various cities. Alternatively, the contents of several smaller delivery vehicles 148 may be consolidated and coalesced into one or more larger delivery vehicles 148 for various delivery routes.

Further, the crossdock operations may include causing a drone 155 (FIG. 6) to land on a drone platform 152 detachably attached to the mobile crossdock 100. To this end, materials may be loaded on or unloaded from a cargo hold 158 located on the drone 155. Causing the drone 155 to land on the drone platform 152 may comprise manually navigating the drone 155 to the drone platform 152; however, in various embodiments, the drone 155 is fully autonomous and may navigate to the drone platform 152 using global positioning system (GPS) coordinates, visual detection, radar, near field communications (NFC), and/or similar techniques.

Assuming a particular vehicle 148 is an inbound vehicle 148, crossdock operations may include providing at least one inbound path to allow unloading a plurality of materials from the inbound vehicle 148 and providing at least one outbound path to allow dividing and loading the plurality of materials into a plurality of outbound vehicles 148. Similarly, assuming a particular vehicle 148 is an outbound vehicle 148, crossdock operations may include providing at least one inbound path to allow unloading a plurality of materials from a plurality of inbound vehicles 148 and providing at least one outbound path to allow coalescing and loading the plurality of materials into the outbound vehicle 148.

After dropping off or obtaining the required shipping materials, in 924, the dock plate, dock leveler, dock board, or similar device, between the delivery vehicle 148 and the floor 124 of the mobile crossdock 100 may be disengaged. The driver of the delivery vehicle 148 may navigate down the ramps 150 provided, if applicable, and navigate away from the mobile crossdock 100 (e.g., proceed to conduct outbound delivery of the materials by fulfilling a delivery route) in 927. Assuming the mobile crossdock operations are complete, in 930, the plurality of doors 106 of the mobile crossdock 100 may be automatically or manually closed to protect the interior 121 of the mobile crossdock 100 from the exterior environment (e.g., rain, wind, or dirt). Any electrical components (e.g., lights, fans, automatic doors) may be turned off to conserve power in 933. Further, the mobile crossdock 100 may be repositioned and/or moved from a first location to a second location using the vehicle trailer 136, a tractor trailer, a forklift, a crane, a helicopter, or similar equipment. Removal of the one or more mobile containers 162 from the platform may be initiated in response to the crossdock operations being completed.

Although the flowchart of FIG. 9 shows a specific order of implementation, it is understood that the order of implementation may differ from that which is depicted. For example, the order of implementation of two or more blocks may be scrambled relative to the order shown. Also, two or more blocks shown in succession in FIG. 9 may be executed concurrently or with partial concurrence. Further, in some embodiments, one or more of the blocks shown in FIG. 9 may be skipped or omitted. It is understood that all such variations are within the scope of the present disclosure.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A mobile crossdock system, comprising:
   a plurality of intermodal freight containers longitudinally aligned in a predefined configuration for crossdock operations, individual ones of the plurality of intermodal freight containers being detachably attached to a single vehicle trailer, at least one of the plurality of intermodal freight containers being modified to comprise a first side having a first plurality of openings and a second side having a second plurality of openings, at least one of the first plurality of openings being directly aligned with at least one of the second plurality of openings, the single vehicle trailer comprising a plurality of wheels facilitating a movement of the mobile crossdock system;
   a plurality of doors aligned with individual ones of the first plurality of openings and individual ones of the second plurality of openings, the plurality of doors being configured to move vertically between a closed position and an open position;
   a plurality of ramps configured to lift a rear end of a delivery vehicle to align a cargo area of the delivery vehicle with a floor of the mobile crossdock system;
   at least one opening in a roof of the mobile crossdock system adapted to receive a drone during a delivery operation; and
   a drone platform positioned in an interior of the mobile crossdock system adapted to receive the drone.

2. The mobile crossdock system of claim 1, further comprising a platform detachably attached to a base of the mobile crossdock system, wherein the platform is configured to dynamically adjust a height of the mobile crossdock system.

3. The mobile crossdock system of claim 1, further comprising a dock plate positioned to bridge a gap between the floor of the mobile crossdock system and the cargo area of the delivery vehicle.

4. A mobile crossdock, comprising:
   a plurality of mobile containers detachably attached to at least one platform in an L-shaped configuration, wherein a distal end of a first one of the plurality of the mobile containers is coupled to a distal end of a second one of the plurality of the mobile containers using a first securing component, and wherein an opposite distal end of the second one of the plurality of mobile containers is coupled to a lateral side of a third one of the plurality of mobile containers using a second securing component;
   wherein the first one and the second one of the plurality of mobile containers comprise at least one lateral side having a plurality of openings, wherein individual ones of the plurality of openings are configured to align with at least one of another mobile container or a cargo area of a vehicle; and
   a plurality of doors aligned with individual ones of the plurality of openings, the plurality of doors being configured to move between a closed position and an open position.

5. The mobile crossdock of claim 4, further comprising a ramp configured to lift a rear end of the vehicle to align the cargo area of the vehicle with a floor of the at least one mobile container.

6. The mobile crossdock of claim 4, wherein the at least one platform further comprises at least one vehicle trailer, the at least one vehicle trailer having a plurality of wheels to facilitate a movement of the mobile crossdock.

7. The mobile crossdock of claim 4, wherein the plurality of doors are configured to move vertically between the closed position and the open position.

8. The mobile crossdock of claim 4, further comprising a drone platform detachably attached to a roof of the mobile crossdock.

9. The mobile crossdock of claim 4, further comprising at least one light located in an interior of the at least one mobile container, the at least one light being powered by a power source.

10. The mobile crossdock of claim 4, further comprising a fan or an air conditioning unit located in an interior of the at least one mobile container, the fan or the air conditioning unit being powered by a power source.

11. The mobile crossdock of claim 4, further comprising a dock plate positioned to bridge a gap between a floor of the mobile crossdock and the cargo area of the vehicle.

12. A method, comprising:
   causing placement of a first one of a plurality of mobile containers at a first location;
   causing placement of a second one of the plurality of mobile containers at a second location;
   coupling a distal end of the first one of the plurality of mobile containers to a lateral side of the second one of the plurality of mobile containers using a securing component to form a mobile crossdock having an L-shaped configuration, the plurality of mobile containers being detachably attached to a platform and comprising at least one lateral side having a plurality of openings;

causing at least one of a plurality of doors aligned with individual ones of the plurality of openings to move between a closed position and an open position, wherein the open position provides access to a vehicle from an interior of the mobile crossdock; and allowing crossdock operations in the mobile crossdock in association with the vehicle.

13. The method of claim 12, further comprising:

providing a dock plate across a gap between a cargo area of the vehicle and a floor of the mobile crossdock; and providing a ramp to raise a rear end of the vehicle to align the cargo area of the vehicle with the floor of the mobile crossdock.

14. The method of claim 12, wherein the platform further comprises at least one vehicle trailer, the at least one vehicle trailer having a plurality of wheels to facilitate a movement of the mobile crossdock.

15. The method of claim 12, further comprising causing removal of at least the first one and the second one of the plurality of mobile containers from the platform in response to the crossdock operations being completed.

16. The method of claim 12, wherein the first one of the plurality of mobile containers or the second one of the plurality of mobile containers comprises a first lateral side having a first plurality of openings and a second lateral side having a second plurality of openings, and at least one of the first plurality of openings is directly aligned with at least one of the second plurality of openings.

17. The method of claim 12, wherein the vehicle is an inbound vehicle and the crossdock operations further comprise:

providing at least one inbound path to allow unloading a plurality of materials from the inbound vehicle; and providing at least one outbound path to allow dividing and loading the plurality of materials into a plurality of outbound vehicles.

18. The method of claim 12, wherein the vehicle is an outbound vehicle and the crossdock operations further comprise:

providing at least one inbound path to allow unloading a plurality of materials from a plurality of inbound vehicles; and providing at least one outbound path to allow coalescing and loading the plurality of materials into the outbound vehicle.

19. The method of claim 12, wherein the first location and the second location are based upon a determined need for the crossdock operations.

20. The method of claim 12, further comprising:

causing placement of a third one of the plurality of mobile containers at a third location; and coupling a distal end of the third one of the plurality of mobile containers to an opposite distal end of the first one of the plurality of mobile containers using another securing component to form the mobile crossdock having the L-shaped configuration.

* * * * *